United States Patent
Zhang et al.

(10) Patent No.: US 7,642,295 B2
(45) Date of Patent: Jan. 5, 2010

(54) ELECTROLYTE MEMBRANE OF SILOXANE-BASED POLYMER AND SOLID POLYMER FUEL CELL UTILIZING THE SAME

(75) Inventors: Zuyi Zhang, Yokohama (JP); Teigo Sakakibara, Yokohama (JP); Motokazu Kobayashi, Yokohama (JP); Masayuki Yamada, Tokyo (JP); Shinji Eritate, Kawasaki (JP); Iko Ito, Takatsuki (JP); Yoshio Kanzaki, Ikoma-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 10/558,669

(22) PCT Filed: Jun. 8, 2004

(86) PCT No.: PCT/JP2004/008289
§ 371 (c)(1),
(2), (4) Date: Nov. 30, 2005

(87) PCT Pub. No.: WO2004/112176
PCT Pub. Date: Dec. 23, 2004

(65) Prior Publication Data
US 2007/0054194 A1  Mar. 8, 2007

(30) Foreign Application Priority Data
Jun. 10, 2003 (JP) .............................. 2003-165279

(51) Int. Cl.
C08J 5/22 (2006.01)
H01M 10/40 (2006.01)
C08G 77/04 (2006.01)
C08G 77/442 (2006.01)

(52) U.S. Cl. .................. 521/27; 526/277; 526/279; 526/329.5; 429/313; 528/26; 528/32

(58) Field of Classification Search ............ None
See application file for complete search history.

(56) References Cited

U.S. PATENT DOCUMENTS 6,339,038 B1  1/2002  Tada et al. ............... 502/326

(Continued)

FOREIGN PATENT DOCUMENTS

JP  2-110121  4/1990

(Continued)

OTHER PUBLICATIONS

[22F-02] "Preparation of Thermally Stable Proton Conducting Polymer (II)," 42(7) *Polymer Preprints* 2490-92 (1993) (w/ English abstract).

(Continued)

*Primary Examiner*—David Wu
*Assistant Examiner*—Vu Nguyen
(74) *Attorney, Agent, or Firm*—Fitzpatrick, Cella, Harper & Scinto

(57) ABSTRACT

An electrolyte membrane made of a phosphate-containing siloxane-based polymer for fuel cell, where the polymer comprises a siloxane backbone and a poly(meth)acrylate chain to which phosphate groups are attached, and the polymer is formed by vinyl polymerization of a silane compound having a (meth)acrylate functional group or a hydrolysis-polycondensation product thereof and a (meth)acrylate compound having a phosphate group, followed by siloxane crosslinking. The electrolyte membrane of a siloxane-based polymer has a high conductivity for a fuel cell.

5 Claims, 1 Drawing Sheet

U.S. PATENT DOCUMENTS

| | | | |
|---|---|---|---|
| 6,451,420 B1 * | 9/2002 | Jin et al. | 428/315.5 |
| 7,160,968 B2 * | 1/2007 | Ito et al. | 526/277 |
| 7,214,756 B2 * | 5/2007 | Nomura et al. | 528/30 |
| 2002/0028388 A1 | 3/2002 | Lee | 429/303 |
| 2006/0029853 A1 | 2/2006 | Kobayashi et al. | 429/33 |
| 2007/0054194 A1 * | 3/2007 | Zhang et al. | 429/313 |
| 2007/0100078 A1 * | 5/2007 | Li et al. | 525/242 |

FOREIGN PATENT DOCUMENTS

| | | |
|---|---|---|
| JP | 2-111440 | 4/1990 |
| JP | 2000-3712 | 1/2000 |
| JP | 2000-90946 | 3/2000 |
| JP | 2001-114834 | 4/2001 |
| JP | 2002-184427 | 6/2002 |
| JP | 2003-155316 | 5/2003 |

OTHER PUBLICATIONS

[IP2a011] "Preparation and Electrical Properties of Proton Conducting Polymers," 43(3) *Polymer Preprints* 735 (1994) (w/ English abstract).

[IP2b012] "Preparation of Thermally Stable Proton Conducting Polymer (V)", 43(3) *Polymer Preprints* 736 (1994) (w/ English abstract).

[II-9-10] "Preparation of Thermally Stable Proton Conducting Polymer," 42(3) *Polymer Preprints* 730 (1993) (w/ English abstract).

* cited by examiner

ELECTROLYTE MEMBRANE OF SILOXANE-BASED POLYMER AND SOLID POLYMER FUEL CELL UTILIZING THE SAME

TECHNICAL FIELD

The present invention relates to an electrolyte membrane made of a phosphate-containing siloxane-based polymer, adapted for use as an electrolyte membrane for a fuel cell, and as an ion exchange membrane or the like. More particularly, it relates to a solid electrolyte membrane made of a phosphate-containing siloxane-based polymer excellent in resistance to heat and organic solvents, and showing a high proton conductivity over the wide ranges of temperature and humidity, and a solid polymer fuel cell utilizing such a membrane.

BACKGROUND ART

As an organic material for use as a proton conductive material, there have been reported polymers belonging to so-called cation exchange resin, such as polystyrenesulfonic acid, polyvinylsulfonic acid, perfluorosulfonic acid polymer, or perfluorocarboxylic acid polymer (cf. Polymer Preprints, Japan, Vol. 42, No. 7, p 2490-2492(1993), Polymer Preprints, Japan, Vol. 43, No. 3, p 735-736(1994), and Polymer Preprints, Japan, Vol. 42, No. 3, p 730(1993)). Such organic material provides an advantage capable of easily forming a membrane on a substrate or directly onto an electrode from a polymer solution, and is already used in practice as a solid electrolyte of a high energy density, for example, in a fuel cell for a rocket (for example Nafion). Although the organic materials show a high proton conductivity at a room temperature in a water-containing condition, they have a drawback that the conductivity tends to decrease at a high temperature of 100° C. or higher.

Japanese Patent Application Laid-Open No. 2001-114834 discloses a polymer electrolyte using a polymer of acrylate ester compound having phosphate group. Such a membrane basically constituted of organic main chains has drawbacks of low heat resistance and low barrier property to hydrogen gas or methanol used as a fuel.

Japanese Patent Application Laid-Open No. 2000-90946 discloses a proton conductive membrane made of an electrolyte which comprises a composite of an inorganic material and an organic material bonded by urethane bond in nano-level and a phosphate compound introduced thereto as a conductivity-providing agent. This membrane can function in a high temperature condition.

Also Japanese Patent Application Laid-Open No. 2002-184427 discloses a proton conductive material having a siloxane network with a sulfonic acid functional group. Introduction of such an inorganic component improves the heat resistance of the membrane, but there still remains a drawback of low water resistance.

Also Japanese Patent Application Laid-Open No. H02-110121 discloses a UV-curable composition constituted of acrylorganosiloxane, polyacrylate or polymethacrylate, a phosphate-containing acryl monomer and a photopolymerization initiator. This composition gives a film having satisfactory adhesiveness to a substrate material, but cannot be used as an electrolyte membrane because it has little proton conductivity.

The present invention has been made in consideration of the aforementioned prior arts, and is to provide an electrolyte membrane of siloxane-based polymer having a high proton conductivity in the wide ranges of temperature and humidity and excellent in resistance to water and methanol. It also is to provide a solid polymer fuel cell utilizing such an electrolyte membrane.

DISCLOSURE OF THE INVENTION

The followings are embodiments of the present invention.

The present invention relates to an electrolyte membrane of a phosphate-containing siloxane-based polymer, where the siloxane-based polymer is formed by vinyl polymerization of a silane compound having a (meth)acrylate ester functional group (hereinafter referred to as (meth)acrylate-silane compound) or a hydrolysis product thereof and a (meth)acrylate ester compound having a phosphate group (hereinafter referred to as phosphate-(meth)acrylate compound), followed by siloxane crosslinking.

The aforementioned hydrolysis product is preferably obtained by hydrolysis/polycondensation of methylalkoxysilane and a (meth)acrylate compound having an alkoxysilyl group.

The aforementioned phosphate-(meth)acrylate compound is preferably a compound represented by the following general formula (A):

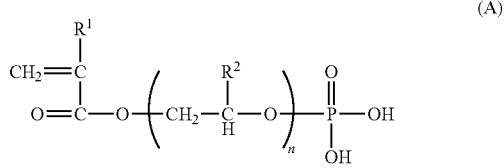

(wherein $R^1$ represents H or $CH_3$; $R^2$ represents H, $CH_3$ or $CH_2Cl$; and n represents an integer from 1 to 10).

The aforementioned siloxane is preferably hardened by using a hardening agent or a siloxane crosslinking component.

The present invention also provides a solid polymer fuel cell employing the aforementioned electrolyte membrane of siloxane-based polymer.

The polymer electrolyte membrane of the present invention is capable of providing a high proton conductivity owing to the phosphate group immobilized to a siloxane structure via polymerization of the (meth)acrylate ester functional group. The electrolyte membrane is finally solidified by siloxane crosslinking to develop the barrier property to methanol and hydrogen gas and high heat resistance.

In the present invention, siloxane crosslinking means a polycondensation reaction between silanol groups and/or alkoxy groups.

As explained above, the present invention can provide an electrolyte membrane of a siloxane-based polymer having phosphate group, which shows an excellent heat resistance and a high conductivity and enables membrane formation, for a fuel cell and for an ion exchange membrane or the like. Also the present invention can provide a solid polymer fuel cell utilizing the aforementioned siloxane-based polymer as the electrolyte membrane.

Other features and advantages of the present invention will be apparent from the following description taken in conjunction with the accompanying drawings.

BEST MODE FOR CARRYING OUT THE INVENTION

Figure 1:
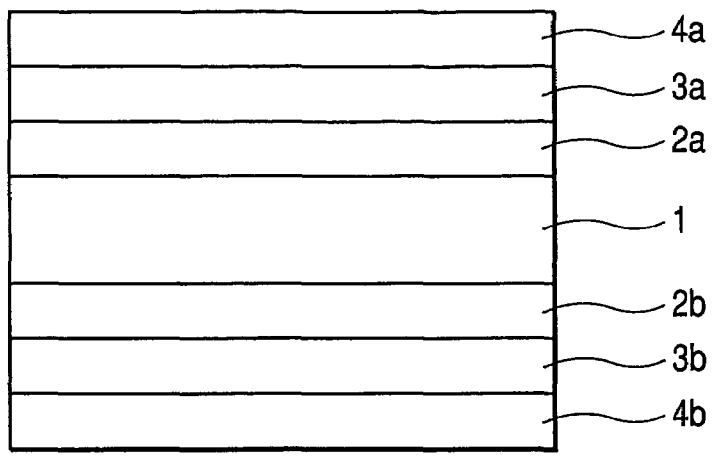
FIG. 1 is a schematic partial view showing an example of a fuel cell of the present invention.

In the following, there will be given a detailed explanation on the polymer electrolyte membrane including phosphate group-containing siloxane of the present invention.

The polymer electrolyte membrane of the present invention comprises a siloxane-based polymer formed by vinyl polymerization of a (meth)acrylate-silane compound or a hydrolysis product thereof and a phosphate-(meth)acrylate compound, followed by siloxane crosslinking.

Siloxane-based polymer in the present invention can be obtained by vinyl polymerization of a (meth)acrylate-silane compound or a hydrolysis product thereof and a phosphate-(meth)acrylate compound, followed by siloxane crosslinking.

The (meth)acrylate-silane compound to be employed in the present invention can be a commercially available compound such as 3-methacryloxypropylmethyl dimethoxysilane, 3-methacryloxypropyl trimethoxysilane, 3-methacryloxypropylmethyl diethoxysilane, 3-methacryloxypropyl triethoxysilane, or 3-acryloxypropyl trimethoxysilane.

A hydrolysis product thereof can be obtained by hydrolysis/polycondensation of a (meth)acrylate-silane compound singly, or by co-polycondensation of a (meth)acrylate-silane compound with an organic silane compound not having a (meth)acrylate ester functional group (organosilane) and a metal alkoxide. Specific examples of the organosilane include methyltrimethoxysilane, methyltriethoxysilane, ethyltrimethoxysilane, ethyltriethoxysilane, n-propyltrimethoxysilane, phenyltrimethoxysilane, dimethyldimethoxysilane, dimethyldiethoxysilane, 3-glycidoxypropyl-trimethoxysilane, 3-glycidoxypropylmethyl-diethoxysilane, and vinyltrimethoxysilane. Specific examples of metal alkoxide include tetramethoxysilane and tetraethoxysilane. It is preferable to use a co-polycondensation product with an organosilane, more preferably a co-polycondensation product with methylalkoxysilane.

The content (molar ratio) of the (meth)acrylate ester functional group to the total silicon atoms in the hydrolysis product is preferably 5 to 100 mol %, more preferably 10 to 80%. The content not less than 5 mol. % is preferable because of effective progress of polymerization reaction with the phosphate-(meth)acrylate compound.

Hydrolysis of a (meth)acrylate-silane compound, organosilane or metal alkoxide is executed by dissolving such a monomer or monomers in a solvent, for instance, alcohol such as methanol, ketone such as acetone, or ether such as ethylene glycol monomethyl ether and by adding water of a necessary amount. For accelerating the reaction, a catalyst for example an inorganic acid such as hydrochloric acid or a base such as ammonia may be added. It is also possible to employ a similar siloxane oligomer obtained by another synthetic method.

The aforementioned hydrolysis product is dispersed in a solvent, and is subjected, in a low viscosity state, to vinyl polymerization with a phosphate-(meth)acrylate compound.

The phosphate-(meth)acrylate compound can be a compound represented by a following general formula (A):

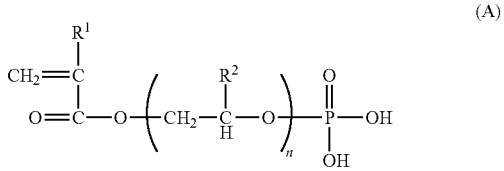

(A)

wherein $R^1$ represents H or $CH_3$; $R^2$ represents $CH_3$ or $CH_2Cl$; n represents an integer from 1 to 10, preferably 1 to 6.

Structural formulas of compounds advantageously employable in the present invention, among those mentioned above, will be shown in the following.

Phosmer PP

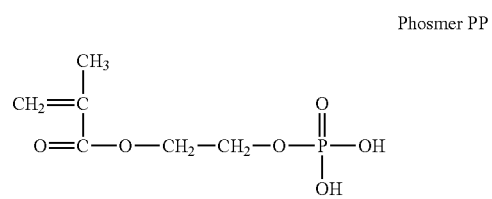

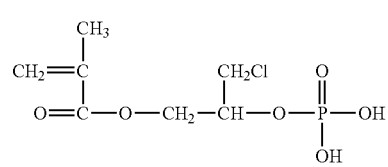

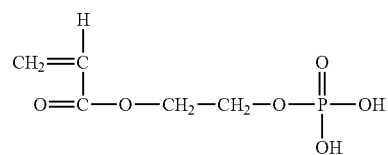

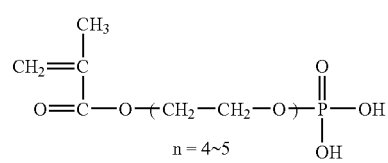

n = 4~5

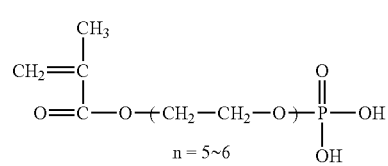

n = 5~6

-continued

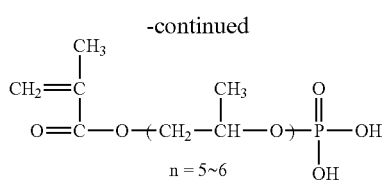

n = 5~6

These compounds include those commercially available under a trade name Phosmer from Unichemical Co. However the compounds employable in the present invention are not limited to such examples.

For the vinyl polymerization reaction of a (meth)acrylate-silane compound or a hydrolysis product thereof with a phosphate-(meth)acrylate compound, the content of the phosphate-(meth)acrylate compound in the raw materials is 5 to 95% by weight, preferably 10 to 80%. With the phosphate-(meth)acrylate compound in this range, the resultant polymer has a high proton conductivity derived from the phosphate group and properties derived from siloxane such as water resistance.

If necessary, another vinyl monomer may be added to the vinyl polymerization system in an amount of 40 wt % or less. Examples of the vinyl monomer include acrylic acid, an acrylate ester, methacrylic acid, a methacrylate ester, acrylonitrile, methacrylonitrile, styrene, a nucleus-substituted styrene, an alkyl vinyl ether, an alkylvinyl ester, a perfluoroalkyl vinyl ether, a perfluoroalkyl vinyl ester, maleic acid, maleic anhydride, fumaric acid, itaconic acid, maleimide and phenylmaleimide. Among these vinyl monomers, particularly preferred ones are a methacrylate ester, acrylonitrile, a styrene, maleimide and phenylmaleimide.

The vinyl polymerization reaction is executed, in a common solvent capable of dissolving the (meth)acrylate-silane or a hydrolysis product thereof and the phosphate-(meth)acrylate compound, utilizing a polymerization initiator, for example, an azo initiator such as 2,2-azobisisobutyronitrile, 2,2-azobis(2,4-dimethylvaleronitrile), dimethyl-2,2-azobis(2-methyl propionate), or dimethyl-2,2-azobisisobutyrate, or a peroxide initiator such as lauryl peroxide, benzoyl peroxide or tert-butyl peroctoate.

Any reaction solvent can be employed unless it can dissolve these raw materials. It can be an alcohol such as methanol, a ketone such as acetone, or an ether such as ethylene glycol monomethyl ether. It is also possible to employ a mixture of two or more solvents.

If hydrolysis product of the (meth)acrylate-siloxane compound tends to gel because of acidity of the phosphate group, it is preferred to add an amine or a derivative thereof to the solvent, or to block in advance the phosphate group of the phosphate-(meth)acrylate compound with an amine or a derivative thereof. In this manner the reaction system becomes neutral to maintain the stability of the siloxane.

Specific examples of amine or a derivative thereof include ethylamine, diethylamine, triethylamine, propylamine, isopropylamine, diisopropylamine, 3-(methylamino)propylamine, 3-(dimethylamino)propylamine, 3-(diethylamino)propylamine, 3-methoxypropylamine, 3-ethoxypropylamine, N-methylethanolamine, and 3-amino-1-propanol. 3-Methoxypropylamine, 3-ethoxypropylamine, N-methylethanolamine, or 3-amino-1-propanol is particularly preferred. Such an amine or a derivative thereof may be eliminated from the system by heating after the membrane formation. Alternatively the amine in the membrane can be removed by proton exchanging using hydrochloric acid or sulfuric acid.

The solvent in the reaction system is employed preferably in an amount of about 100 to 2000 parts, more preferably 150 to 1000 parts to 100 parts of the raw material components by weight. The polymerization initiator is employed preferably in an amount of about 0.01 to 0.5 parts, more preferably about 0.1 parts to 100 parts by weight of the raw materials. The solvent and the polymerization initiator outside the aforementioned ranges are not desirable because the polymer becomes a gel insoluble in various solvents, making film formation difficult.

The polymerization is executed under agitation of the reaction solution and at a temperature equal to or higher than 40° C., more preferably at a temperature equal to or higher than 60° C. but not exceeding the boiling point of the solvent.

If necessary, a monomer for strengthening the siloxane matrix or an oligomer thereof and a hardening agent for siloxane may be added prior to the membrane formation.

Examples of the monomer for reinforcing the siloxane matrix include a trifunctional silane such as methyltrimethoxylsilane, methyltriethoxylsilane, ethyltrimethoxylsilane, ethyltriethoxylsilane, n-propyltrimethoxysilane, phenyltrimethoxysilane, 3-glycidoxypropyl trimethoxysilane, 3-glycidoxypropylmethyl diethoxysilane, or vinyltrimethoxysilane, and a tetrafunctional silane such as tetramethoxysilane or tetraethoxysilane.

For the hardening agent of siloxane, there is advantageously employed an organometallic compound, a metal alkoxide, or a derivative thereof. These compounds accelerate polycondensation of remaining silanol, thereby forming a durable siloxane matrix. Specific examples include an organometallic compound such as tin acetyl acetonate, dibutyl tin octylate, dibutyl tin laurate or dibutyl tin acetonate, and a metal alkoxide such as tetra-i-propoxy titanium, tetra-n-butoxy titanium, tetraquis(2-ethylhexyloxy) titanium, tetrastearyloxy titanium, tetraethoxy zirconium, tetra-i-propoxy zirconium, tetra-n-butoxy zirconium, tetra-sec-butoxy zirconium, tetra-t-butoxy zirconium, tetra-n-pentoxy zirconium, tetraquis(2-ethylhexyloxy) zirconium, tetrastearyloxy zirconium, triethoxy aluminum, tri-i-propoxy aluminum, mono-sec-butoxy-propoxy aluminum, tri-sec-butoxy aluminum, triethoxy iron (II), tri-i-propoxy iron (III), tri-i-propoxy indium, pentaethoxy tungsten, hexaethoxy tungsten, tetramethoxysilane or tetraethoxysilane. An oligomer formed by hydrolysis of a metal alkoxide may also be employed. There may also be employed an alkoxide partially stabilized with β-diketone, acetic acid or the like.

Furthermore, when vinyl polymerization of the (meth)acrylate-silane compound with the phosphate-(meth)acrylate compound is executed before hydrolyzing alkoxy groups of the (meth)acrylate-silane or a large amount of the alkoxy group remains in the hydrolysis product, water may be added prior to membrane formation for accelerating hydrolysis/polycondensation. In such case, the phosphate group functions as a catalyst for hydrolysis, but another acid catalyst such as hydrochloric acid may be added if necessary.

In the following, an example of the polymerization reaction of the present invention will be shown.

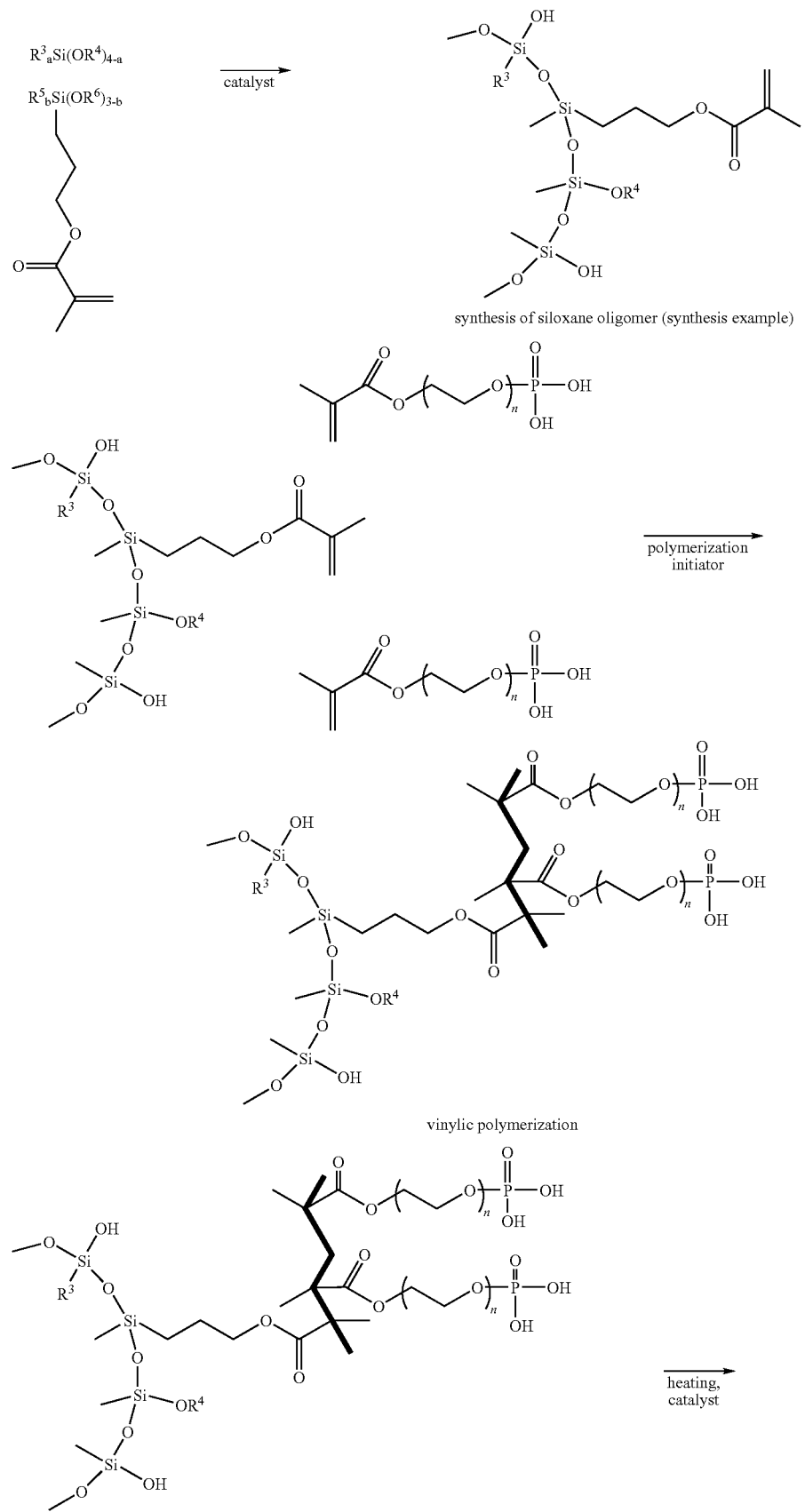

-continued

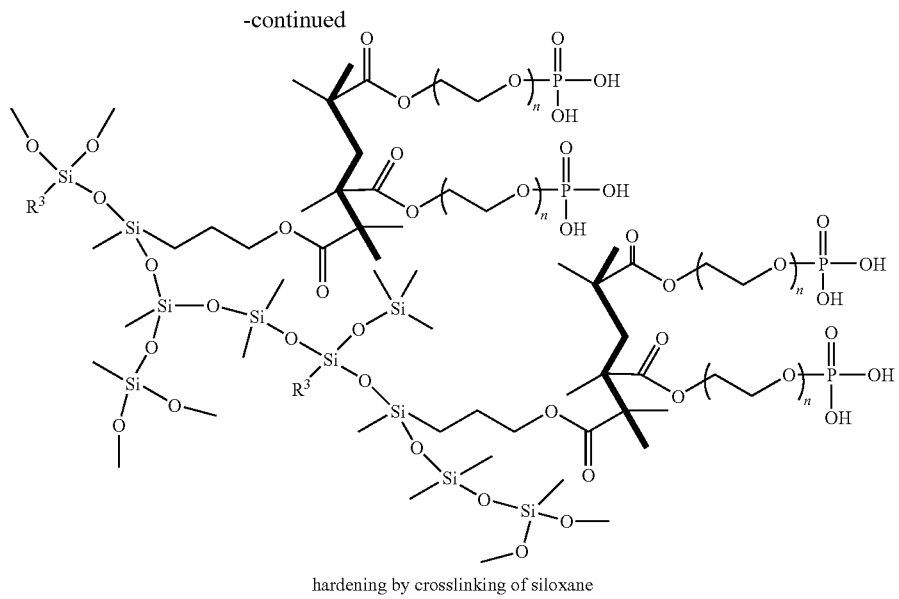

hardening by crosslinking of siloxane

In the above formulas $R^3$ and $R^5$ each represents an organic group for example an alkyl group such as methyl, a phenyl group, a 3-glycidoxypropyl group or a vinyl group; $R^4$ and $R^6$ each represents an alkyl group such as methyl or ethyl; a represents an integer from 0 to 3; b represents an integer from 0 to 2; and n represents an integer from 1 to 10.

An electrolyte membrane is formed by a known method from the polymer solution obtained by the aforementioned method. An electrolyte membrane can be obtained by casting the polymer solution on the surface of a base material, followed by drying. The thickness of the membrane can be regulated for example by using an air knife, a bar coater, a doctor blade, a metering roller or a doctor roller.

After the membrane formation, the crosslinking of siloxane is promoted further to improve the durability of the membrane. For promoting the crosslinking, there is employed a method of drying or drying under a reduced pressure, at a temperature not exceeding 300° C.

Thus obtained siloxane-based polymer membrane can be employed as a solid electrolyte membrane, and a fuel cell can be assembled by providing catalysts, diffusion layers and electrodes on both sides of the electrolyte membrane.

FIG. 1 is a schematic partial view of an example of a fuel cell of the present invention.

Referring to FIG. 1, electrode catalyst layers 2a, 2b, diffusion layers 3a, 3b and electrodes 4a, 4b serving also as a current-collecting member are provided in this order on both sides of a polymer electrolyte membrane 1.

The electrode catalyst layer 2a at a side of a fuel pole is constituted of an electrode catalyst such as a platinum catalyst and a conductive carbon.

The electrode catalyst to be employed in the present invention is preferably supported on the surface of conductive carbon. The supported catalyst preferably has an average particle size as small as possible, specifically within a range of 0.5 to 20 nm, more preferably 1 to 10 nm. A particle size less than 0.5 nm results in an excessively high activity of the catalyst particles making handling difficult. On the other hand, a particle size exceeding 20 nm reduces the surface area of the catalyst, thus reducing the reacting site and probably the activity.

In place for the platinum catalyst, there may be employed a metal of platinum group such as rhodium, ruthenium, iridium, palladium or osmium, or an alloy of such a metal with platinum. Particularly in case of employing methanol as a fuel, it is preferable to employ an alloy of platinum and ruthenium.

The conductive carbon employable in the present invention can be selected from carbon black, carbon fibers, graphite and carbon nanotube. Also it preferably has an average particle size within a range of 5 to 1000 nm, more preferably 10 to 100 nm. However, as certain coagulation takes place in the actual use, the particle size distribution may become wide such as 20 to 1000 nm or even larger.

Also in order to support the aforementioned catalyst, the conductive carbon preferably has a relatively large specific surface area such as 50 to 3000 $m^2/g$, more preferably 100 to 2000 $m^2/g$.

The catalyst may be supported on the surface of conductive carbon by various known methods. For example, there is known, as disclosed in Japanese Unexamined Patent Publication Nos. H02-111440 and 2000-003712, a method of impregnating the conductive carbon with a solution of platinum or another metal and then reducing such precious metal ions thereby such a metal can be supported by the surface of the conductive carbon. Also the catalyst application to the conductive carbon can be achieved by a vacuum membrane forming method such as sputtering, utilizing the precious metal to be supported as a target.

The electrode catalyst thus prepared is contacted, either singly or after mixing with a binder, a polymer electrolyte, a water-repellent agent, conductive carbon, a solvent etc., with the polymer electrolyte membrane and a diffusion layer described later.

The diffusion layers 3a, 3b introduce a fuel such as hydrogen, modified hydrogen, methanol or dimethyl ether and an oxidant such as air or oxygen to the electrode catalyst layer efficiently and uniformly, and execute electron exchange in contact with the electrodes. They are generally constituted preferably of a conductive porous membrane, such as a carbon paper, a carbon cloth, or a composite sheet of carbon and polytetrafluoroethylene.

The surface and the interior of the diffusion layer may be coated with a fluorinated paint for water repellency.

As the electrodes 4a, 4b, the conventional electrodes can be utilized without particular limitation as long as they can efficiently supply the diffusion layers with the fuel and the oxidant and achieve electron exchange therewith.

The fuel cell in the present invention is prepared by laminating the polymer electrolyte membrane, the electrode catalyst layers, the diffusion layers and the electrodes as illustrated in FIG. 1, but it may have an arbitrary shape, and also the producing method is not particularly restricted and can be a prior method.

In the following, the present invention will be clarified further by examples, but the present invention will not be limited to such examples.

SYNTHESIS EXAMPLE 1

20 g of isopropyl alcohol was put in a 100-ml flask, and 10 g of 3-methacryloxypropylmethyl diethoxysilane and 10 g of methyltriethoxysilane were added thereto. Then 3.5 g of 0.01 N hydrochloric acid was added dropwise under agitation. Reaction was conducted for 8 hours at 50° C. on an oil bath to obtain a siloxane oligomer S1.

SYNTHESIS EXAMPLE 2

20 g of isopropyl alcohol was put in a 100-ml flask, and 10 g of 3-methacryloxypropyl triethoxysilane and 10 g of methyltriethoxysilane were added thereto. Then 3.5 g of 0.01 N hydrochloric acid was added dropwise under agitation. Reaction was conducted for 8 hours at 50° C. on an oil bath to obtain a siloxane oligomer S2.

SYNTHESIS EXAMPLE 3

20 g of isopropyl alcohol was put in a 100-ml flask, and 10 g of 3-methacryloxypropyl triethoxysilane, 5 g of dimethyldimethoxysilane and 5 g of methyltriethoxysilane were added thereto. Then 3.5 g of 0.01 N hydrochloric acid was added dropwise under agitation. Reaction was conducted for 8 hours at 50° C. on an oil bath to obtain a siloxane oligomer S3.

EXAMPLE 1

20 g of siloxane oligomer S1 was put in a 100-ml round-bottom flask. After purged with nitrogen, the flask was heated at 80° C. in an oil bath to initiate refluxing. A small amount of nitrogen gas was continuously introduced during the subsequent polymerization process. 5 g of acid-phosphoxy-polypropylene glycol-methacrylate (Phosmer PP, UniChem Co.), 60 g of methyl ethyl ketone and 10 mg of AIBN were mixed and the mixed solution was added dropwise to the reaction in the flask from a dropping funnel at a constant rate over several minutes. Temperature was maintained at 80° C. even after the dropwise addition, and agitation was continued overnight to obtain a yellowish polymer solution.

The solution was applied on a Teflon (trade mark) sheet, dried for 24 hours at about 25° C. under a, reduced pressure, and was heated at 120° C. in air. The obtained membrane had a thickness of 0.12 mm. Gold electrodes were formed by evaporation on the membrane using ion sputtering, and conductivity was measured in an atmosphere of 50° C. and 80%. The membrane had a conductivity of $1.1 \times 10^{-3}$ Scm$^{-1}$.

EXAMPLE 2

20 g of siloxane oligomer S2 was put in a 100-ml round-bottom flask. After purge with nitrogen, heating was executed at 80° C. in an oil bath to initiate refluxing. A small amount of nitrogen gas was continuously introduced during the subsequent polymerization process. A mixed solution of 5 g of acid-phosphoxy-polypropylene glycol-methacrylate (Phosmer PP, UniChem Co.), 60 g of methyl ethyl ketone and 10 mg of AIBN was prepared and was added to the flask dropwise from a dropping funnel at a constant rate over several minutes. Temperature was maintained at 80° C. even after the dropwise addition and agitation was continued overnight to obtain a yellowish polymer solution.

The solution was applied on a Teflon (trade mark) sheet, dried for 24 hours under a reduced pressure at about 25° C., and was heated at 120° C. in air. The obtained membrane had a thickness of 0.12 mm. Gold electrodes were formed by evaporation on the membrane using ion sputtering, and conductivity was measured in an atmosphere of 50° C. and 80%. The membrane had a conductivity of $1.2 \times 10^{-2}$ Scm$^{-1}$.

EXAMPLE 3

20 g of siloxane oligomer S3 were put in a 100-ml round-bottom flask. After purge with nitrogen, heating was executed at 80° C. in an oil bath to initiate refluxing. A small amount of nitrogen gas was continuously introduced during the subsequent polymerization process. A mixed solution of 5 g of acid-phosphoxy-polypropylene glycol-methacrylate (Phosmer PP, UniChem Co.), 60 g of methyl ethyl ketone and 10 mg of AIBN was prepared and was added dropwise from a dropping funnel at a constant rate over several minutes. Temperature was maintained at 80° C. even after the dropwise addition and agitation was continued overnight to obtain a yellowish polymer solution.

After 1 g of a solution of 2 wt. % dibutyl tin acetonate in isopropyl alcohol was added to the polymer solution, it was agitated for 30 minutes at the room temperature. The obtained solution was applied on a Teflon (trade mark) sheet, dried for 24 hours under a reduced pressure at about 25° C., and was heated at 120° C. in air. The obtained membrane had a thickness of 0.12 mm. Gold electrodes were formed by evaporation on the membrane using ion sputtering, and conductivity was measured in an atmosphere of 50° C. and 80%. The membrane had a conductivity of $1.0 \times 10^{-3}$ Scm$^{-1}$.

EXAMPLE 4

20 g of siloxane oligomer S3 were put in a 100-ml round-bottom flask. After purge with nitrogen, the flask was heated at 80° C. in an oil bath to initiate refluxing. A small amount of nitrogen gas was continuously introduced during the subsequent polymerization process. A mixed solution of 5 g of acid-phosphoxy-polypropylene glycol-methacrylate (Phosmer PP, UniChem Co.), 0.69 g of 2-aminoethanol, 60 g of methyl ethyl ketone and 10 mg of AIBN was prepared and was added dropwise to the flask from a dropping funnel at a constant rate over several minutes. Temperature was maintained at 80° C. even after the dropwise addition and agitation was continued overnight to obtain a yellowish polymer solution.

0.5 g of tetramethoxysilane were added to the polymer solution under agitation and were reacted for 8 hours. Then 1 g of a solution of 2 wt % dibutyl tin acetonate in isopropyl alcohol was added and the mixture was agitated for 30 minutes at the room temperature. The obtained solution was applied on a Teflon (trade mark) sheet, dried for 24 hours under a reduced pressure at about 25° C., and was heated at 100° C. in air. The obtained membrane had a thickness of 0.12 mm. Gold electrodes were formed by evaporation on the membrane using ion sputtering, and conductivity was measured in an atmosphere of 50° C. and 80%. The membrane had a conductivity of $1.2\times10^{-3}$ Scm$^{-1}$.

EXAMPLE 5

20 g of siloxane oligomer S3 were put in a 100-ml round-bottom flask. After purge with nitrogen, heating was executed at 80° C. in an oil bath to initiate refluxing. A small amount of nitrogen gas was continuously introduced during the subsequent polymerization process. A mixed solution of 5 g of acid-phosphoxy-polypropylene glycol-methacrylate (Phosmer PP, UniChem Co.), 0.69 g of 2-aminoethanol, 60 g of methyl ethyl ketone and 10 mg of AIBN was prepared and was added dropwise to the flask from a dropping funnel at a constant rate over several minutes. Temperature was maintained at 80° C. even after the dropwise addition and agitation was continued overnight to obtain a yellowish polymer solution.

A mixed solution of 5 g of isopropyl alcohol and 0.5 g of aluminum tri-sec-butoxide was added to the polymer solution and was reacted for 8 hours. The obtained solution was applied on a Teflon (trade mark) sheet, dried for 24 hours under a reduced pressure at about 25° C., and was heated at 100° C. in air. The obtained membrane had a thickness of 0.12 mm. Gold electrodes were formed by evaporation on the membrane using ion sputtering, and conductivity was measured in an atmosphere of 50° C. and 80%. The membrane had a conductivity of $1.0\times10^{-3}$ Scm$^{-1}$.

COMPARATIVE EXAMPLE 1

A mixture of 5 g of acid-phosphoxy-polypropylene glycol-methacrylate (Phosmer PP, UniChem Co.) and 30 g of methyl ethyl ketone was put in a 100-ml flask. After purge with a small amount of nitrogen, a mixed solution of 30 g of methyl ethyl ketone and 10 mg of AIBN was prepared and added dropwise to the flask from a dropping funnel at a constant rate over several minutes. Temperature was maintained at 80° C. even after the dropwise addition and agitation was continued overnight to obtain a yellowish polymer solution.

The solution was applied on a Teflon (trade mark) sheet, dried for 24 hours under a reduced pressure at about 25° C., and was heated at 120° C. in air. The obtained membrane had a thickness of 0.12 mm. This membrane was employed in a comparative experiment of the fuel cell as a sample not containing siloxane.

Evaluation Of Voltage-Current Curve In Fuel Cell 4 g of conductive carbon (IEPC40A-II, manufactured by Ishifuku Kinzoku Kogyo Co.) supporting a catalyst (platinum 40 wt. %-ruthenium 20 wt. %) were mixed with 10 g of water and 8 g of a 5% solution of Nafion (trade name, supplied by Wako Pure Chemical Co.) to obtain a paste.

The paste was applied and dried on a surface of a carbon paper of a thickness of 0.2 mm (TGP-H-060, manufactured by Toray Ltd.). The coating amount of the platinum-ruthenium alloy was about 4 mg/cm$^2$. The catalyst-coated surface of the aforementioned carbon paper was contacted with both surfaces of each of the electrolyte membranes of Examples 1 to 3 and Comparative Example, and was pressed under conditions of 100° C. and 4.9 MPa (50 kg/cm$^2$) to obtain the MEA (membrane electrode assemblies).

The MEA prepared above was assembled in a fuel cell. The cell had an area of 25 cm$^2$.

In each cell, a 5% aqueous solution of methanol and air were respectively supplied to the fuel pole side and the air pole side. Electric power was generated under heating of the cell at 80° C.

Figure 2:
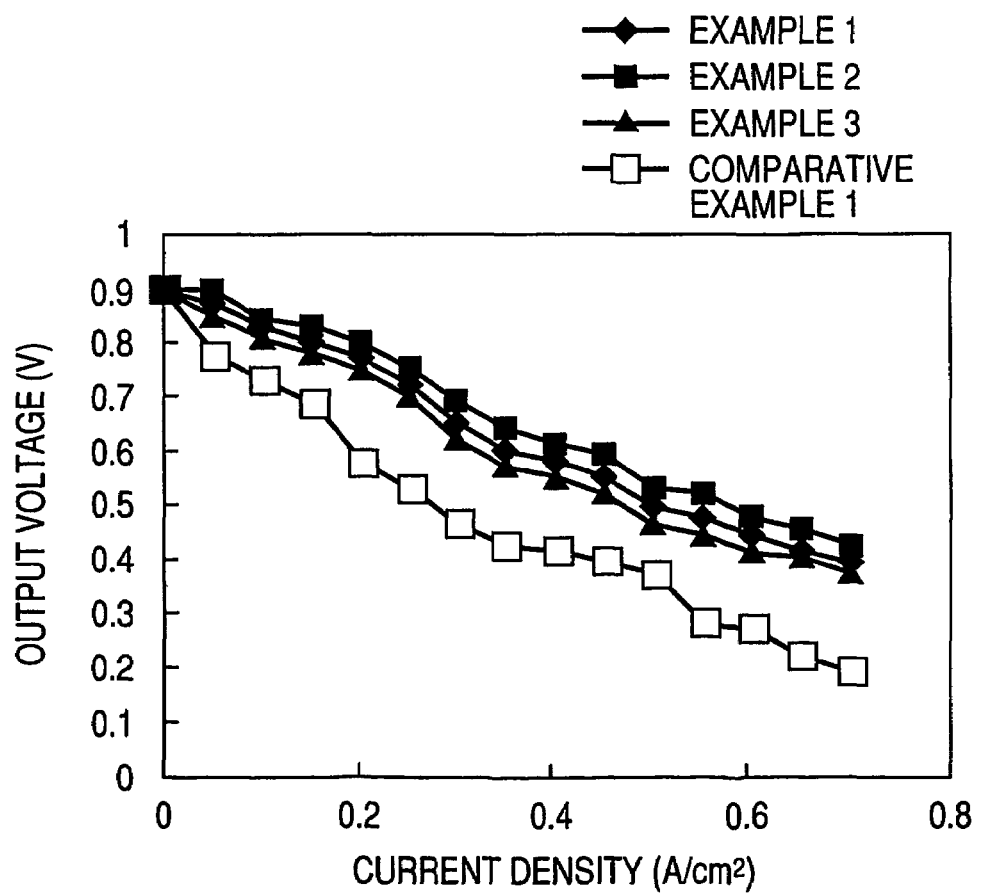
FIG. 2 is a chart showing a current-voltage relationship in cells utilizing electrolyte membranes of Examples 1 to 3 and a cell utilizing an electrolyte membrane of Comparative Example.

FIG. 2 shows a voltage-current relationship in the cells utilizing the electrolyte membranes of Examples 1 to 3 and that of Comparative Example 1. It can be seen that the fuel cells of Examples 1 to 3 of the present invention could stably provide the output up to 0.6 A/cm$^2$, but that of Comparative Example 1 provided a lower current.

The invention claimed is:

1. An electrolyte membrane comprising a siloxane-based polymer, wherein the siloxane-based polymer is obtained by vinyl polymerization of a hydrolysis product of a silane compound having a (meth)acrylate functional group and a methylalkoxysilane with a molar ratio of the silane compound having the (meth)acrylate functional group to total silicon atoms from 10 to 80%, and a (meth)acrylate compound having a phosphate group, followed by siloxane crosslinking.

2. The electrolyte membrane according to claim 1, wherein said (meth)acrylate compound having a phosphate group is a compound represented by the following general formula (A):

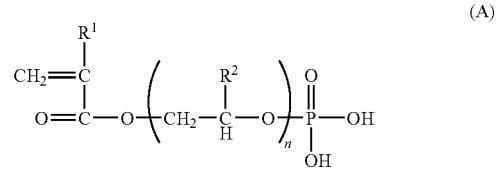

wherein $R^1$ represents H or $CH_3$; $R^2$ represents H, $CH_3$ or $CH_2Cl$; and n represents an integer from 1 to 10.

3. The electrolyte membrane according to claim 1, wherein the membrane is hardened with a hardening agent or a siloxane crosslinking component.

4. A solid polymer fuel cell comprising an electrolyte membrane of a siloxane-based polymer according to claim 1.

5. A method for producing an electrolyte membrane comprising a phosphate-containing siloxane-based polymer, the method comprising the steps of:

providing a silane compound having a (meth)acrylate functional group, a methylalkoxysilane and a (meth)acrylate compound having a phosphate group with a molar ratio of the silane compound having the (meth) acrylate functional group to total silicon atoms from 10 to 80%;

carrying out hydrolysis/polycondensation to form a siloxane polymer having a (meth)acrylate functional group;

carrying out vinyl polymerization with the siloxane polymer and the (meth)acrylate compound having a phosphate group to obtain a siloxane-based polymer;

forming a membrane from the siloxane-based polymer; and crosslinking the siloxane-based polymer.

* * * * *